Figure 1:
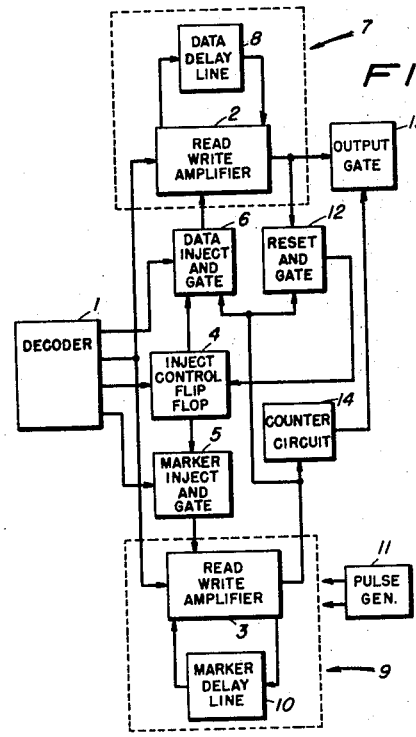

Aug. 18, 1964  J. A. PERSCHY  3,145,369
MAGNETOSTRICTIVE STABILITY DEVICE
Filed May 31, 1962

James A.
Perschy
INVENTOR

BY

ATTORNEY

United States Patent Office 3,145,369
Patented Aug. 18, 1964

3,145,369
MAGNETOSTRICTIVE STABILITY DEVICE
James A. Perschy, Silver Spring, Md.
(1508 E. Crestview Drive, Laurel, Md.)
Filed May 31, 1962, Ser. No. 199,069
3 Claims. (Cl. 340—173)

This invention relates to recirculating memory systems and, more particularly, to an improved stability circuit for a memory system utilizing a magnetostrictive delay line.

A magnetostrictive delay line consists of a nickel wire element, a magnetostrictive write transducer and a magnetostrictive read transducer. The write transducer is attached to the nickel wire element by means of two metal arms. When a bit of information is written on the nickel wire element, the write transducer twists the element by rotation of the metal arms in either a clockwise or counter-clockwise direction, and then allows the element to return to its neutral position. The torsional impulse travels in both directions from the metal arms. On one side of the arms, the impulse is terminated in a way that causes no reflection. The impulse on the other side of the arms travels down the element. The impulse is picked up on the other end of the element by the read transducer which is attached to the element in the same manner as the write transducer. Current pulses into the write transducer will produce output signals from the read transducer, delayed by the sonic length of the wire element. Bits of information may be closed-loop recirculated on the magnetostrictive delay line by a read-write amplifier.

The sonic length of a delay line may change because of temperature and aging effects. The usual delay line is precisely constructed to give the exact amount of required delay. As the bit rate increases the cost of manufacture increases many times to keep the amount of change in sonic length within the maximum value that can be tolerated by the memory system. This maximum value of change is usually called the drift time and is expressed as a percentage of a bit time. Normally, a delay line can tolerate a drift time of less than plus or minus one quarter of a bit. Using the stabilizing approach of the instant invention a drift time of more than plus or minus one-half a bit can be tolerated.

This drift problem is anticipated and is usually avoided as much as possible by costly precise manufacturing methods. The present invention can tolerate the increased amount of drift time in its recirculating acoustic delay line because of an improved gating and retiming technique.

To insure the availability of a precise retiming period an improved pulse generator is utilized. The accuracy of the pulse generator does not rest in the accuracy of its frequency standard but rather in its associated circuits. This pulse generator has the flexibility of being able to provide the required pulse width over a wide variation of frequency inputs, by dividing the frequency standard by the integral number from two to four. The output of the timing generator is a 225 nano-second pulse occurring at the rate of one megacycle, regardless of instability of the frequency standard. In order to obtain other output pulse rates or widths, it would only be necessary to use different values of delay for the delay lines contained therein.

One object of the present invention, therefore, resides in the provision of an improved memory system employing a magnetostrictive delay line and a novel stability circuit therefor.

Another object of the invention is to provide a memory circuit employing a novel pulse generator whose stability is independent of any variations in output of its associated frequency standard.

A further object of the invention is to provide an improved memory system having a low power requirement.

Figure 2:
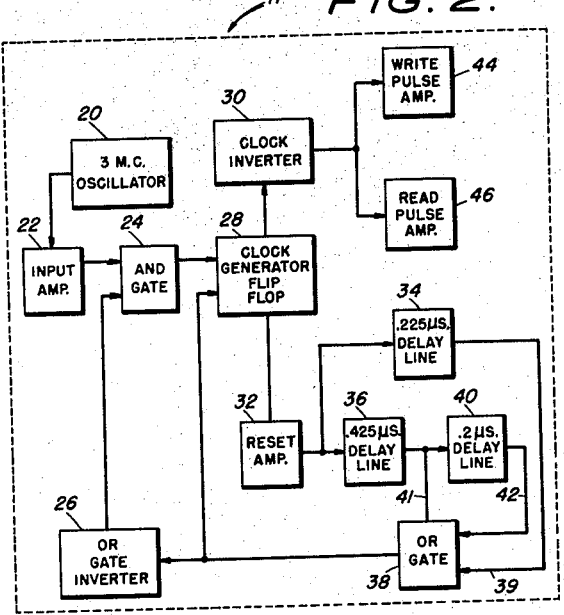
Figure 3:
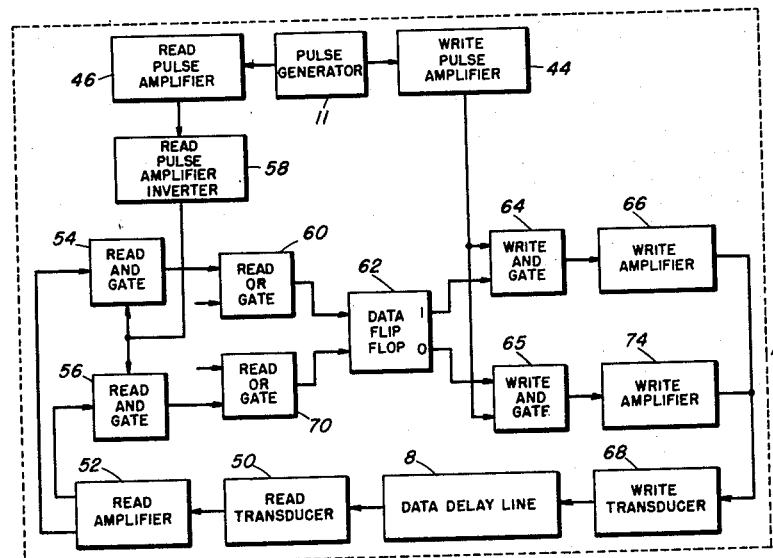

The above-mentioned and other features and objects of this invention will become more apparent by reference to the following description taken in conjunction with the accompanying drawings, in which:

FIG. 1 is a generalized block diagram of the invention;
FIG. 2 is a block diagram of the pulse generator employed; and
FIG. 3 is a block diagram of a data loop employed.

The memory system, shown in FIG. 1, has a capacity of 2,049 bits. The block 1 represents a decoder portion a memory system. This square represents the decoder with all of its electronic circuits required to interpret the incoming information signal and transfer the intelligence contained therein to the proper subsequent intelligence channels. It is not the purpose of this application to specify the type of decoder employed, for it may vary depending on the environment within which it operates. The only requirement of this circuit is that it be a source of four signals commonly utilized in memory systems. These four outputs are sequentially operated, the first initiates a memory loading sequence and is applied to two read-write amplifiers 2 and 3, to erase any information contained therein, the second is a conditioning pulse applied to an inject control flip-flop 4, the third furnishes a marker bit to a marker inject "and" gate 5, and the fourth furnishes data bits to a data inject "and" gate 6.

There are two magnetostrictive delay line loops in the magnetostrictive delay line memory; a data loop 7 consisting of a data delay line 8 and the data read-write amplifier 2, and a marker loop 9 consisting of a timing marker delay line 10 and the marker read-write amplifier 3. The length of the data loop 7 is 2,049 memory clock pulse times, while the length of the marker loop 9 is 2,048 memory clock pulse times. Since both loops recirculate in synchronization with the output of a pulse generator 11, there is a precise timing relationship between the two. During the load process, every time the timing marker appears in the marker loop output and enables a data inject "and" gate 6, a data bit is injected into the data loop 7. A data bit will be inserted into adjacent positions on the data loop on every cycle of the marker loop until the load process is complete. This completion is signified by the coincidence of the timing marker from the marker loop 9 and the reappearance of the first data bit injected into the data loop 7 in a reset "and" gate 12. A bit from the data loop 7 is sampled for transmission in an output gate 13 every eighth cycle of the timing marker in the marker loop, as specified in a counter circuit 14. The separate blocks illustrated are conventional in accordance with the legends applied thereto and therefore need not be shown in detail.

The pulse generator 11 employed in the instant invention is shown in FIG. 2, wherein a three megacycle oscillator 20, of standard design, is employed as the frequency standard to drive the subsequent timing generator circuitry. Its output pulse width is independent of any variation from the frequency standard due to its jitter or drift. An input amplifier 22 receives the signal from the oscillator 20 and transmits it to an "and" gate 24. This gate has two inputs, one of which receives the signal from the input amplifier 22, the second of which is an enabling pulse from an "or" gate inverter 26. In the absence of this enabling input, the "and" gate 24 cannot transmit the signal received from the oscillator to the subsequent circuitry. Such an enabling input is available when the first pulse from the oscillator 20 is supplied.

The output of the "and" gate 24 drives a clock generator flip-flop 28 to its first stable state wherein it applies one of its outputs to a clock inverter 30 and the other to a reset amplifier 32.

The output of the reset amplifier 32 drives a delay line 34, having a length of 225 nano-seconds and a delay line 36, having a length of 425 nano-seconds. The output of delay line 34 is applied to an "or" gate 38 by a line 39. The output of the "or" gate 38 is applied to the clock generator flip-flop 28 driving it back to its second stable state wherein it reverses the polarity of its outputs. The resulting pulse applied to the clock inverter 30 is the timing pulse used throughout the memory circuit, while the corresponding pulse applied to the reset amplifier 32 is used as an inhibitory pulse. The output of the "or" gate 38 is also applied to the "or" gate inverter 26 which then removes the enabling pulse from the "and" gate 24 suspending its operation.

The output of day line 36 will begin to drive a delay line 40 having a length of 200 nano-seconds and will be applied to the "or" gate 38 by a line 41 before the output from the delay line 34 ceases. Although the output of the "or" gate 38 will be applied to the clock generator flip-flop 28, it is of such a nature as to keep that flip-flop in its second stable state. The output of the "or" gate 38 will also be applied to the "or" gate inverter 26 which will continue to inhibit the "and" gate 24. The output of the delay line 40 will be applied to the "or" gate 38 by a line 42 before the output from the delay line 36 ceases. The output of the "or" gate 38 will not affect the clock generator flip-flop 28 but will continue to inhibit the "and" gate 24 through the "or" gate inverter 26. The total inhibiting period for the "and" gate 24 is 625 nano-seconds, and causes two positive half cycles of the 3 megacycle input to be repressed. The clock generator flip-flop 28 will be triggered on the fourth positive half cycle to begin the process again.

The output of the clock inverter 30 will be a clock pulse with a duration of 225 nano-seconds and a repetition rate of one megacycle, and will be applied to both a write pulse amplifier 44 and a read pulse amplifier 46. The output of these amplifiers will provide the required timing pulse throughout the memory circuits, having a given width regardless of variations in the frequency standard.

In operation, the circuitry associated with the 3 megacycle oscillator acts as a pulse generator. The pulse width is determined by the delay line 34 and the total blanking time is the sum of the delay lines 36 and 40. Therefore, it can be seen that the pulse width can be easily altered by changing the value of the delay line 34. The value of the combined blanking time is chosen in order to inhibit the unwanted positive signals generated by the oscillator 20 which otherwise could affect the repetition rate of the clock pulses generated by the clock generator flip-flop 28.

Although the combined blanking time is determined by the sum of the delay lines 36 and 40, these delay lines may not be combined into one for obvious reasons, that is, an inhibitory effect from delay line 36 must be felt by both the "and" gate 24 and the clock generator flip-flop 28 before the inhibitor effect from delay line 34 ceases.

Referring now to FIG. 3, there may be seen a block diagram of the data loop 7 employed in the invention. Since both the data loop 7 and the marker loop 9 are identical, the following description is applicable to both loops when operating in the recirculating mode.

The information circulating in the data delay line 8 will be read by a read transducer 50 as a positive pulse for a one and a negative pulse for a zero. The signal is amplified and clipped by a read amplifier 52 which has a phase split output. When the read amplifier 52 reads a one, its output enables a read phase one "and" gate 54 while simultaneously inhibiting the read phase two "and" gate 56. When the read amplifier 52 reads a zero, the functioning of its output is reversed. Both the read "and" gate 54 and the read "and" gate 56 have two inputs, one of which is the enabling pulse from the read amplifier 52, the other of which is an inhibiting pulse from a read pulse amplifier inverter 58.

The output of the read "and" gate 54, signifying the reading of a one in the read amplifier 52, is applied to a read "or" gate 60. The "or" gate 60 has two inputs, one of which is a recirculating data input from the read "and" gate 54, and the other is a data insertion input which is used during the loading process as described with reference to FIG. 1.

The output from the read "or" gate 60 drives the first stage of a data flip-flop 62 to its one position wherein an enabling pulse of positive polarity is applied to a phase one write "and" gate 64.

The pulse generator 11 now furnishes a "read" pulse to the read pulse amplifier 46, and a "write" pulse to the write pulse amplifier 44. The amplified "read" pulse is inverted in the inverter 58 and applied as an inhibiting pulse to both the read "and" gate 54 and the read "and" gate 56. During the duration of this "read" pulse no information may pass through the read "and" gate 54 and the read "or" gate 60 to trigger the data flip-flop 62 which momentarily stores a single bit of data for the duration of the "read" pulse.

Simultaneous with the application of the "read" pulse to the read "and" gate 54 as an inhibiting pulse, the write pulse amplifier 44 applies a "write" pulse to the write "and" gate 64 and a phase two write "and" gate 65.

The write "and" gate 64 has two inputs, one of which is an enabling data input from the data flip-flop 62, and the other is an enabling timing pulse from the write pulse amplifier 44. The data pulse passing through the write "and" gate 64 is of constant amplitude throughout its entire duration, and its duration is determined by the availability of the "write" pulse.

The output from the write "and" gate 64 is applied to a write amplifier 66 where the pulse is amplified and then it is applied to a write transducer 68 which writes the retimed data pulse back into the delay line 8.

When the read amplifier 52 is reading a zero, its output applies an enabling pulse to a read "and" gate 56 whose output is applied to a read "or" gate 70 whose output drives the second stage of the data flip-flop 62 to its zero position wherein an enabling pulse is applied to the write "and" gate 65. On the next application of the simultaneous "read" pulse and "write" pulse, the "read" pulse inhibits the operation of both the read "and" gate 54 and the read "and" gate 56, isolating the data flip-flop 62 from the read amplifier 52. With the data flip-flop 62 again isolated, its output will remain constant during the entire write pulse from the write pulse amplifier 44, enabling the write "and" gate 72, whose output is amplified in a write amplifier 74 and applied to the data delay line 8 by the write transducer 68.

In operation, the data flip-flop 62 is triggered by the read "and" gate 54 and the read "and" gate 56 depending on whether a zero or a one has been read by the read transducer 50. Previously in systems of this nature, no attempt was made to isolate the data which was about to be resampled and retimed and inserted back into the delay line. The "read" pulse applied as an inhibiting pulse to the gates 54 and 56 isolates the storage facility, the data flip-flop 62, during the entire resampling and retiming period. This means that the retimed pulse is not degraded by jitter in the delay line. This novel isolation arrangement enables the recirculating memory system to tolerate a larger amount of drift time than was previously possible.

While I have described above the principles of my invention in connection with specific apparatus, it is to be clearly understood that this description is made only by way of example and not as a limitation to the scope of my invention as set forth in the objects thereof and in the accompanying claims.

I claim:
1. In a recirculating memory system of the type employing a magnetostrictive delay line for storing a plurality of data bits, a read transducer, and a write transducer, a stability device therefore, comprising, means for generating basic timing signals, each of said signals having an enabling period and an inhibiting period, an inverter connected to said timing means for generating an inverted timing signal having an inhibiting period corresponding to said enabling period of said basic timing signal and an enabling period corresponding to said inhibiting period of said basic timing signal, means for storing successive data bits during said enabling period of said basic timing signal and said corresponding inhibiting period of said inverted timing signal, a first gating means responsive to said read transducer and said inverter for passing data bits to said storing means during the enabling period of said inverted timing signal, and a second gating means responsive to said storing means and said generating means for removing the input to said write transducer from said storing means during the inhibiting period of said basic timing signal, whereby said write transducer rewrites the retimed data bit into said delay line.

2. In a recirculating memory system of the type employing a magnetostrictive delay line for storing a plurality of data bits, a read transducer, and a write transducer, a stability device therefore, comprising, means for generating basic timing signals, each of said signals having an enabling period and an inhibiting period, said enabling period being shorter in time than each of said data bits, an inverter connected to said timing means for generating an inverted timing signal having an inhibiting period corresponding to said enabling period of said basic timing signal and an enabling period corresponding to said inhibiting period of said basic timing signal, a first "and" gate connected to said read transducer and said inverter for passing therethrough one of said data bits for the duration of the enabling period of said inverted timing signal, a multivibrator responsive to said first "and" gate for storing said passed data bit for the duration of the inhibiting period of said inverted timing signal, a second "and" gate responsive to said multivibrator and said generating means for passing said stored data bit to said write transducer for the duration of said enabling period of said basic timing pulse, whereby said stored data bit is retimed and said write transducer reinserts said data bit into said delay line.

3. In a recirculating memory system of the type employing a magnetostrictive delay line for storing a plurality of positive and negative data bits, a read transducer, and a write transducer, a stability device therefore, comprising, means for continuously generating basic timing signals having an enabling time period shorter than one of said data bits and an inhibiting time period for the remainder of each timing period, an inverter circuit connected to said timing means for generating an inverted timing signal having an inhibiting period corresponding to said enabling period of said basic timing period and an enabling period corresponding to said inhibiting period of said basic timing period, an amplifier responsive to said read transducer for producing a positive and a negative output signal for each of said recirculating data bits, a multivibrator having a first stage and a second stage for storing said positive signals from said amplifier, a first, phase one "and" gate connected to said amplifier and said inverter for passing said positive output signal corresponding to said positive data bits during said enabling period of said inverted timing signal to said first stage of said multivibrator and for removing the input to said first stage during the inhibiting period of said inverted timing signal, a first, phase two "and" gate connected to said amplifier and to said inverter for passing said positive output signal corresponding to said negative data bit during the enabling period of said inverted timing signal to said second stage of said multivibrator and for removing the input to said second stage during the inhibiting period of said inverted timing signal, a second, phase one "and" gate connected to said first stage of said multivibrator and to said basic timing source for sampling the contents of said first stage of said multivibrator during the enabling time period of said basic timing signals and for removing the output of said first stage from said write transducer during said isolating period of said basic timing signal, and a second, phase two "and" gate connected to said second stage of said multivibrator and to said basic timing source for sampling the contents of said second stage during the enabling time period of said basic timing signals and for isolating said write transducer from said second stage during said inhibiting period of said basic timing signals, whereby each of said recirculating data bits in said delay line is retimed by said enabling portion of said basic timing signals and reinserted into said delay line by said write transducer.

References Cited in the file of this patent
UNITED STATES PATENTS

| | | |
|---|---|---|
| 2,933,717 | Tyas | Apr. 19, 1960 |
| 2,961,535 | Lanning | Nov. 22, 1960 |
| 2,978,680 | Schulte | Apr. 4, 1961 |
| 3,021,484 | Mestre | Feb. 13, 1962 |